United States Patent
Maker

[11] Patent Number: 5,845,484
[45] Date of Patent: Dec. 8, 1998

[54] FUEL CONTROL SYSTEM FOR A GAS TURBINE ENGINE

[75] Inventor: Paul Manwaring Maker, Wrentham, Mass.

[73] Assignee: Lucas Industries Inc., Reston, Va.

[21] Appl. No.: 803,679

[22] Filed: Feb. 21, 1997

Related U.S. Application Data

[60] Provisional application No. 60/011,986 Feb. 21, 1996.

[51] Int. Cl.⁶ ........................................................ F02C 9/28
[52] U.S. Cl. ............................................ 60/39.281; 60/739
[58] Field of Search ................................ 60/39.281, 734, 60/739

[56] References Cited

U.S. PATENT DOCUMENTS 5,339,636  8/1994  Donnelly et al. .......................... 60/739
5,448,882  9/1995  Dyer et al. ............................ 60/39.281
5,709,079  1/1998  Smith .................................. 60/39.281

*Primary Examiner*—Louis J. Casaregola
*Attorney, Agent, or Firm*—Jacobson, Price, Holman & Stern, PLLC

[57] ABSTRACT

A fuel control system for a gas turbine engine having a plurality of burner manifolds, comprising a spill valve for spilling excess fuel from a high pressure fuel supply line and a plurality of control arrangements, each of which is arranged to control fuel flow rate to a respective one of the manifolds and comprises a metering valve and a regulator for regulating the pressure drop across the metering valve, the spill valve having a cylinder containing a piston which is movable to close the spill valve and each of the regulators having a valve for connecting the cylinder of the spill valve to high pressure fuel when the pressure drop across the metering valve is less than a predetermined value.

5 Claims, 1 Drawing Sheet

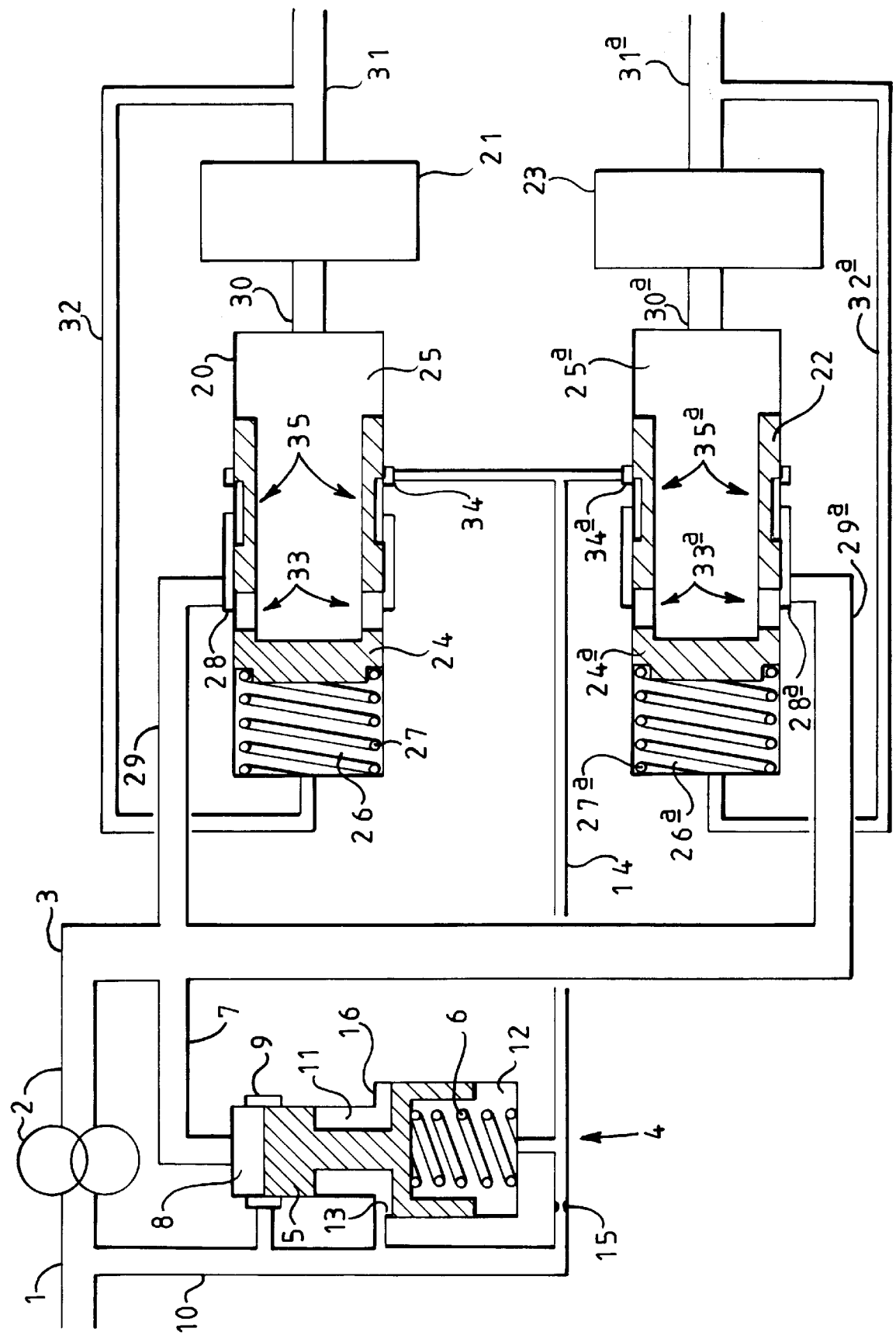

FUEL CONTROL SYSTEM FOR A GAS TURBINE ENGINE

This application is related to provisional application Ser. No. 60/011,986 filed on Feb. 21, 1996.

The present invention relates to a fuel control system for a gas turbine engine, for instance for use in an aircraft.

UK Patent No 2285286 discloses a fuel supply system wherein a pump and an associated spill valve supply fuel to two individually controlled burner zones and a fluid logic control selects the zone having the highest pressure demand as the zone which controls the spill valve. It is an object of the present invention to provide a system which can accommodate a larger plurality of zones in a simple and convenient manner.

According to the invention, there is provided a fuel control system for a gas turbine engine having a plurality of burner manifolds, comprising a spill valve for spilling excess fuel from a high pressure fuel supply line and a plurality of control arrangements, each of which is arranged to control fuel flow rate to a respective one of the manifolds and comprises a metering valve and a regulator for regulating the pressure drop across the metering valve, the spill valve having a cylinder containing a piston which is movable to close the spill valve and each of the regulators having a valve for connecting the cylinder of the spill valve to high pressure fuel when the pressure drop across the metering valve is less than a predetermined value.

The piston of the spill valve may be biased towards a position for closing the spill valve, for instance by a spring. The piston of the spill valve may divide the cylinder of the spill valve into a first chamber communicating with a low pressure fuel line and a second chamber communicating with the low pressure fuel line via a flow restrictor and with the valves of the regulators.

Each regulator may comprise a cylinder and a piston dividing the regulator cylinder into first and second chambers, the first chamber having a first outlet connected to an inlet of the metering valve, a second outlet connected to the second chamber of the spill valve cylinder, and an inlet connected to the high pressure fuel supply line, the second chamber of the regulator cylinder being connected to an outlet of the metering valve, the piston of the regulator cylinder being arranged to control the flow of fuel from the inlet to the first outlet and having an orifice cooperating with the second outlet to connect the second outlet to the inlet when the pressure drop across the metering valve is less than the predetermined value.

The invention will be further described, by way of example, with reference to the accompanying drawing, which is a schematic diagram of a fuel control system constituting an embodiment of the invention.

The fuel control system shown in the drawing is for use with a gas turbine engine having a plurality of burner manifolds. The drawing illustrates a system for two manifolds for primary and secondary burners of a gas turbine engine for use as a jet engine in an aircraft.

A low pressure fuel line 1 is connected to the inlet of a pump 2 whose outlet is connected to a high pressure fuel supply line 3. The line 3 is connected to a spill valve 4 for spilling excess fuel from the pump 2 back to the low pressure line 1.

The spill valve 4 comprises a piston 5 biased upwardly in the drawing by a compression spring 6. The line 3 is connected via a line 7 to a chamber 8 defined between the upper end of the piston 5 and the upper end of the spill valve 4. The chamber 8 has an outlet connected via an annular manifold 9 to a line 10 which is connected to the low pressure fuel line 1.

The other end of the piston divides the remainder of the spill valve 4 into chambers 11 and 12. The chamber 11 is connected via a port 13 to the line 10. The chamber 12 is connected to a line 14 and via a pressure-reducing restriction 15 to the line 10. A shoulder 16 in the housing of the spill valve 4 limits upward movement of the piston 5 such that the upper and of the piston closes the ports leading to the manifold 9.

A respective control arrangement is provided for each of the manifolds of the gas turbine engine. In the embodiment illustrated in the drawing, two such control arrangements are shown. The control arrangement for the primary burner manifold comprises a primary regulator 20 and a primary metering valve 21 whereas the control arrangement for the secondary burner manifold comprises a secondary regulator 22 and a secondary metering valve 23. The control arrangements are identical to each other and accordingly only the control arrangement for the primary burner manifold will be described in detail. Corresponding parts in the control arrangement for the secondary burner manifold are referred to by the same reference numbers but with a subscript "a".

The primary regulator 20 comprises a piston 24 which divides the regulator into chambers 25 and 26. The chamber 26 contains a compression spring 27 which urges the piston 24 to the right in the drawing.

The regulator has an inlet 28 connected to the high pressure supply line 3 by a line 29. An outlet 30 is connected to the inlet of the primary metering valve 21, whose outlet is connected to a fuel supply line 31 to the primary burner manifold. The line 31 is connected by a line 32 to the chamber 26.

The piston 24 has orifices 33 which cooperate with the inlet 28 so as to control the flow of fuel through the outlet 30 to the metering valve 21. The regulator 20 also has an outlet 34 connected via the line 14 to the chamber 12 of the spill valve 4. The piston 24 has a reduced diameter portion 35, the left end of which is connected to inlet pressure and the right end of which cooperates with a plurality of small holes in the cylinder wall which form the outlet 34 to control the supply of high pressure fuel via the line 14 to the chamber 12 of the spill valve 4.

During steady state operation, the piston 5 of the spill valve 4 adopts an equilibrium position which represents a balance between the high pressure fuel in the chamber 8 acting on the upper end of the piston 5 and servo pressure in the chamber 12 acting on the lower end of the piston 5. The area of the upper end of the piston 5 is, for instance, half the area of the lower end of the piston 5 so that, for equilibrium and ignoring the effect of the spring 6, the servo pressure in the chamber 12 is half the high pressure in the chamber 8. For this to be the case, the fixed orifice represented by the restriction 15 and connecting the chamber 12 to the low pressure line 1 must be equal to the variable orifice formed by the cooperation between the portions 35, 35a and the inlets 28, 28a and outlets 34, 34a acting between the chamber 12 and the high pressure line 3. Accordingly, by selecting the size and location of the portions 35, 35a in relation to the inlets 28, 28a and the outlets 34, 34a, the positions of the regulator pistons 24, 24a can be established when the spill valve 4 is in its equilibrium state. However, the regulators 20, 22 seek their own equilibria where the pressures at opposite ends of the pistons 24, 24a i.e. at outlet 30, 30a and in lines 31, 31a, differ by enough to balance the force exerted by the springs 27, 27a.

In an initial condition in the absence of system pressure, in particular when the pump 2 is not yet operating, the pistons 24, 24*a* are all biased to the right by the springs 27, 27*a*. Thus, the orifices 33, 33*a* are fully open and the reduced diameter portion 35, 35*a* is fully to the right so that the variable orifices connect the chamber 12 via the line 14 to the high pressure line 3. Similarly, the spring 6 biases the piston 5 upwardly so that the outlet 9 of the spill valve 4 is fully closed. As the pump 2 begins to operate and pump speed rises, fuel is delivered via the regulators 20, 22 to the metering valves 21, 23 and the fuel pressure rises throughout the system. The flow through the metering valves 21, 23 causes a pressure drop across the metering valves 21, 23 to increase. For each of the valves 21, 23, when the pressure drop across the valve reaches a nominal value, the piston 24, 24*a* of the corresponding regulator 20, 22 is urged to the left so as to restrict the flow by reducing the pressure applied to the metering valve. The variable orifice formed by the portions 35, 35*a* cooperating with the inlets 28, 28*a* and the outlets 34, 34*a* is reduced so that the servo pressure supplied by the regulator to the line 14 which is common to all of the regulators is reduced. However, if another metering valve requires higher pressure at its line 31, 31*a*, the corresponding regulator piston would not have moved so that the servo pressure variable orifice remains fully open and pump pressure continues to rise.

This process continues until all except one of the regulators is restricting the high pressure fuel supply to the respective metering valves. The positions of the regulator pistons 24, 24*a* are further to the left in those regulators 20, 22 where the corresponding metering valve 21, 23 is set to demand a lower pressure. However, the spill valve 4 remains closed until the last regulator piston moves to the left and restricts servo fuel flow through the line 14 to the chamber 12. As the last regulator piston 24, 24*a*, corresponding to the metering valve requiring highest pressure, moves to the left, a position is reached where the variable orifice restricts the supply of high pressure fuel through the outlets 34, 34*a* so that the servo pressure in the chamber 12 of the spill valve 4 is reduced. When the pressure in the chamber 12 is equal to half the pressure in the chamber 8, the spill valve reaches equilibrium such that the high pressure supply from the pump to the control arrangements is sufficient to supply the fuel demanded by all of the metering valves 21, 23 including that demanding the highest pressure.

If the metering valve 21, 23 currently demanding the highest pressure is controlled to demand less than another of the metering valves 21, 23, there is a temporary increase in the metering valve pressure drop. This causes the piston 24, 24*a* of the associated regulator 20, 22 to move to the left so as to reduce the servo pressure to the chamber 12 of the spill valve 4. The piston 5 thus moves downwardly to spill more fuel from the supply line 3 so as to compensate for the reduced total fuel flow demand. The high pressure thus falls so that all of the regulator valve pistons 24, 24*a* move to the right in order to drop less pressure. The first of the regulator pistons 24, 24*a* to reach the position where its variable orifice opens then takes over control of the spill valve. Thus, the spill valve 4 is always controlled by the regulator 20, 25*a* associated with the metering valve 21, 23 requiring the highest fuel pressure.

It is thus possible to provide a fuel control system which is capable of meeting all operational fuel demands by controlling the spill valve in a simple and elegant way. Whichever control arrangement currently requires the highest fuel pressure automatically takes control, via the cooperating portions 35, 35*a* and outlets 34, 34*a* and the common line 14, of the operation of the spill valve to ensure that the pump supplies sufficient fuel to all of the control arrangements for correct operation. No specific control arrangement has sole control over the spill valve so that any of the control arrangements may demand a higher fuel pressure rate and take control of the spill valve in order to ensure sufficient supply from the pump.

Operation is automatic and no changeover devices are required. It is therefore possible to provide a relatively simple system having high reliability of operation. Any number of similar or identical control arrangements may be provided and the spill valve is always controlled by the regulator of the arrangement requiring the highest pressure.

I claim:

1. A fuel control system for a gas turbine engine having a plurality of burner manifolds, comprising a spill valve for spilling excess fuel from a high pressure fuel supply line and a plurality of control arrangements, each of which is arranged to control fuel flow rate to a respective one of the manifolds and comprises a metering valve and a regulator for regulating the pressure drop across the metering valve, the spill valve having a cylinder containing a piston which is movable to close the spill valve and each of the regulators having a valve for connecting the cylinder of the spill valve to high pressure fuel when the pressure drop across the metering valve is less than a predetermined value.

2. A system as claimed in claim 1, wherein the piston of the spill valve is biased towards a position for closing the spill valve.

3. A system as claimed in claim 2, wherein said piston is biased by a spring.

4. A system as claimed in claim 1, wherein said piston of the spill valve divides the cylinder of the spill valve into a first chamber communicating with a low pressure fuel line and a second chamber communicating with the low pressure fuel line via a flow restrictor and with the valves of the regulators.

5. A system as claimed in claim 1, wherein each regulator comprises a cylinder and a piston dividing the regulator cylinder into first and second chambers, the first chamber having a first outlet connected to an inlet of the metering valve, a second outlet connected to the second chamber of the spill valve cylinder, and a regulator inlet connected to the high pressure fuel supply line, the second chamber of the regulator cylinder being connected to an outlet of the metering valve, the piston of the regulator cylinder being arranged to control the flow of fuel from the regulator inlet to the first outlet and having an orifice cooperating with the second outlet to connect the second outlet to the regulator inlet when the pressure drop across the metering valve is less than the predetermined value.

* * * * *